(12) United States Patent
Kim

(10) Patent No.: US 6,784,885 B1
(45) Date of Patent: *Aug. 31, 2004

(54) METHOD AND APPARATUS FOR THREE-DIMENSIONAL PARALLAX DRAWING

(75) Inventor: Je Man Kim, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 317 days.

This patent is subject to a terminal disclaimer.

(21) Appl. No.: 09/583,495

(22) Filed: May 30, 2000

Related U.S. Application Data

(63) Continuation of application No. 08/948,651, filed on Oct. 10, 1997, now Pat. No. 6,091,419.

(30) Foreign Application Priority Data

Oct. 10, 1996 (KR) .............................. 96-45143

(51) Int. Cl.[7] .............................................. G06T 15/20
(52) U.S. Cl. ........................... 345/427; 345/419; 345/7; 345/564; 345/568; 345/569; 345/572; 348/44
(58) Field of Search .......................... 345/419, 7, 427, 345/420, 422, 564, 568, 569, 572, 565; 348/44

(56) References Cited

U.S. PATENT DOCUMENTS

| | | | | |
|---|---|---|---|---|
| 5,181,133 A | * | 1/1993 | Lipton | 349/15 |
| 5,684,529 A | * | 11/1997 | Yoshimi et al. | 348/43 |
| 5,745,739 A | | 4/1998 | Wang et al. | |
| 5,751,927 A | * | 5/1998 | Wason | |
| 5,860,912 A | * | 1/1999 | Chiba | 348/45 |
| 5,929,859 A | * | 7/1999 | Meijers | |
| 6,091,419 A | * | 7/2000 | Kim | 345/419 |

* cited by examiner

*Primary Examiner*—Kim Nguyen
(74) *Attorney, Agent, or Firm*—Marger Johnston & McCollom, P.C.

(57) ABSTRACT

A three dimensional parallax drawing system for use in three dimensional graphics or virtual reality is disclosed. The parallax drawing system includes a three dimensional address generator which generates the original X-axis, Y-axis and Z-axis addresses of an image, and an address correction circuit for producing a corrected X-axis address in response to the original X-axis and Z-axis address outputs from the address generator. Also included is an address selection circuit for selecting either the original X-axis address supplied from the three dimensional address generator or the corrected X-axis address from the address correction circuit as a resultant X-axis address in response to a stereo graphic mode request signal. A frame buffer address generator is provided for converting the resultant X-axis address received from the address selection means and the Y-axis address received from the three dimensional address generator into the frame buffer linear address. The X-axis parallax of human eyes relative to all points of an object can be converted into the X-axis addresses. Thus, once the 3-D image of the object is projected by separating the left and right eyes' views and reflecting the corrected X-axis addresses, a more vivid image having a better perspective of distance can be seen though the LCD shutters.

5 Claims, 6 Drawing Sheets

METHOD AND APPARATUS FOR THREE-DIMENSIONAL PARALLAX DRAWING

This application is a continuation of U.S. patent application Ser. No. 08/948,651 filed Oct. 10, 1997 U.S. Pat. No. 6,091,419 which is incorporated by reference.

BACKGROUND OF THE INVENTION

1. Field of the Invention

The present invention relates to three dimensional graphic accelerators, and more particularly to a three dimensional parallax drawing system for use with virtual reality systems.

2. Description of the Related Art

Most modern graphic boards have graphic accelerators which provide the ability to quickly move data to video memory from other places in the computer. Graphic accelerators have been improved for use in three-dimensional games or graphics as well as virtual reality. In order to implement the 3-D graphics, well known texture mapping, perspective projection, shading, fog and depth cueing techniques are widely used. Texture mapping allows the graphic accelerator to calculate the memory address of the desired 3-D image to read out the texture data stored in the video memory and again write into the frame buffer. These techniques provide two-dimensional images with a sense of perspective; however, the 3-D image produced by conventional graphic accelerators is somewhat different from what is seen by human eyes in the real world. The human eyes perceives how far away an object is by using parallax. FIG. 1 shows the binocular disparity relative to a hexahedral object. Assuming a view plane 10 in front of the human eyes, a left eye's view 20 and a right eye's view 30 are formed in the view plane 10 and reach the retinas of two eyes LE and RE. The left eye's view 20 is different in shape from the right eye's view 30 due to the distance between the two eyes. This binocular disparity results in a perception of how far or near the object is.

If the view plane 10 of FIG. 1 is replaced by the monitor screen, and the corresponding 3-D image produced by a conventional graphic accelerator is represented thereon, the image seen by the human eyes can be depicted as shown in FIG. 2. Once the image appears at the monitor, each eye focuses on the monitor screen and the composite images of views 20, 30 are simultaneously seen by the eyes. Thus, the images presented in the monitor screen cannot be seen with the parallax effect.

In order to separate the left eye's view 20 and the right eye's view 30 in the monitor screen and thus to give the parallax effect, LCD Shutter techniques have been widely used in combination with raster display systems. Such techniques are known in the art as "stereo graphics." FIG. 3 illustrates the LCD Shutter technique. The stereo graphic system includes goggles placed nearby two eyes, and LCD shutters 60 and 70 are provided inside the goggles. In the interlaced monitor screen 40, the left eye's view 20 and the right eye's view 30 are separately presented according to even numbered scan lines 50 and odd numbered scan lines 55. The left shutter 60 and right shutter 70 are operated in synchronization with the even numbered scan plane and odd numbered scan plane, respectively, such that the left LCD shutter 60 is activated during the presentation of the left eye's view 20 while the right LCD shutter 70 is deactivated to shield the right eye's view 30 of the monitor screen.

However, the above LCD shutter system still has limitations in providing a realistic perspective of an object.

SUMMARY OF THE INVENTION

It is therefore an object of the invention to provide a three dimensional parallax drawing system in which a vivid perspective effect can be obtained.

In accordance with the present invention, there is provided a three dimensional parallax drawing system comprising: an address generator located at a graphic accelerator and generating the X-axis, Y-axis and Z-axis addresses of an image; an address correction means for producing a corrected X-axis address in response to the X-axis and Z-axis address outputs from the three dimensional address generator; an address selection means for selecting one of the original X-axis address supplied from the three dimensional address generator and the corrected X-axis address from the address correction circuit in response to a stereo graphic mode request signal; a frame buffer address generator for converting the X-axis address received from the address selection means and the Y-axis address received from the three dimensional address generator into the frame buffer linear address.

The address correction circuit comprises an operation unit for receiving the Z-axis address and calculating the corresponding corrected X-axis address, and an adder for producing a resultant X-axis address consisting of the original X-axis address and the corrected X-axis address. Also, the address selection means includes a multiplexer.

According to this invention, the X-axis parallax of human eyes relative to all points of an object can be converted into the X-axis addresses. Thus, once the 3-D image of the object is projected with separating the left and right eye's views and reflecting the corrected X-axis addresses, a more vivid image having better perspective can be seen through the LCD shutters.

BRIEF DESCRIPTION OF THE DRAWINGS

This invention may be understood and its object, features and advantages will become apparent to those skilled in the art by reference to the accompanying drawings in which.

DETAILED DESCRIPTION

Figure 1:
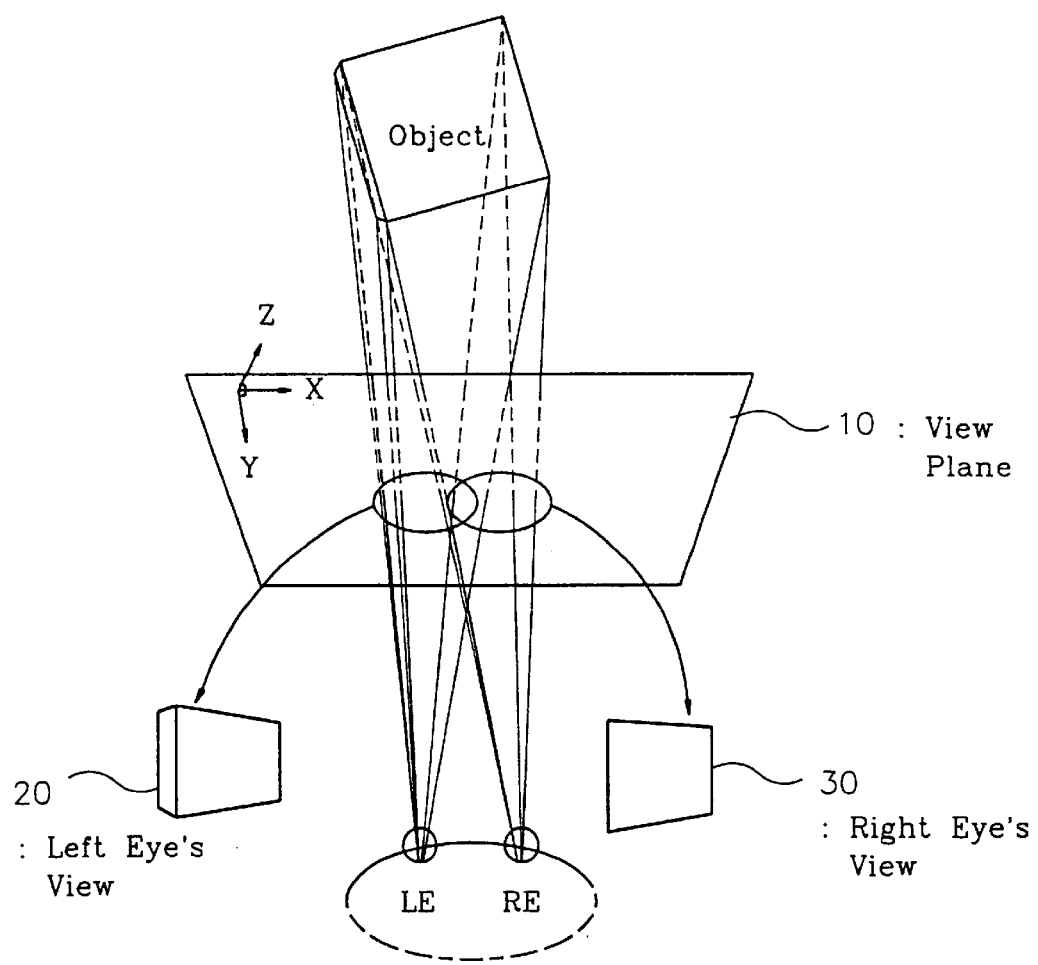
FIG. 1 is a graphical representation for explaining parallax of human eyes relative to an object.
Figure 2:
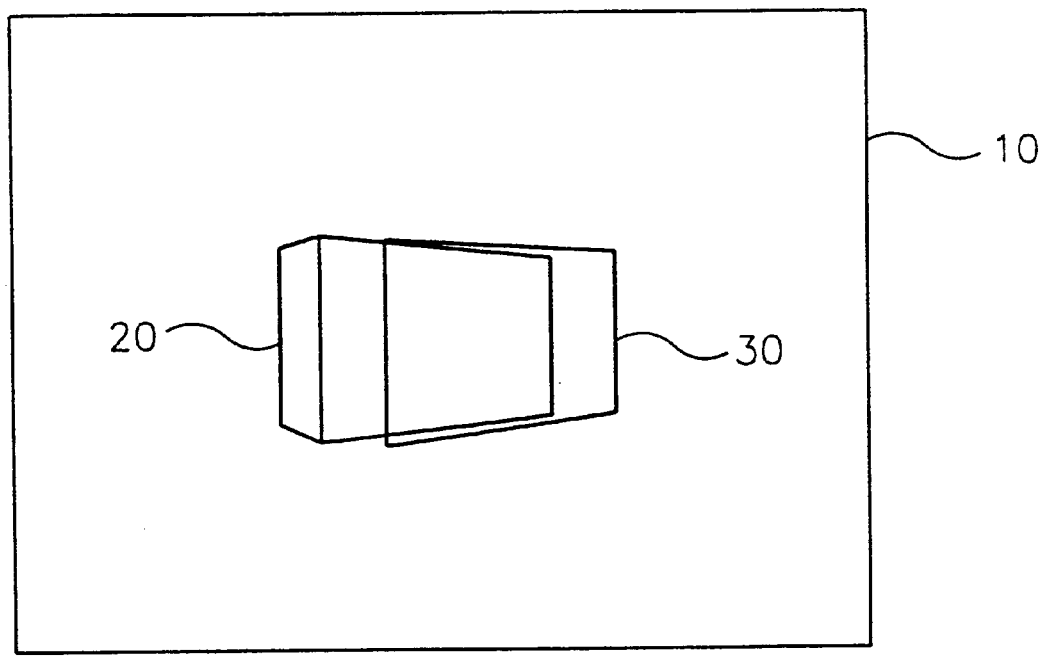
FIG. 2 is a diagram depicting the view plane of FIG. 1 on which two eyes' views are projected.
Figure 3:
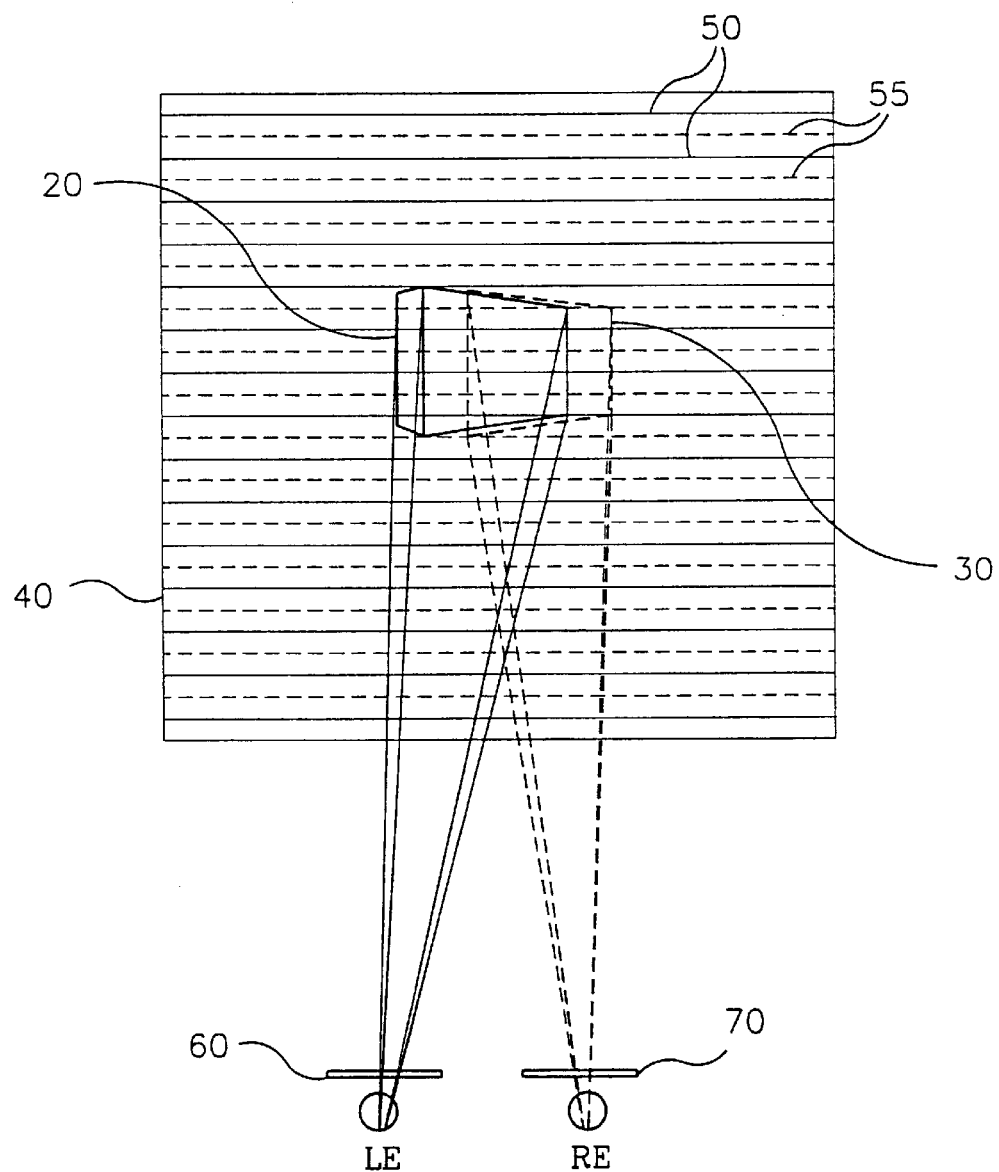
FIG. 3 is a graphical representation of a method that separates the left and right eyes' views of an object using a conventional LCD shutter system.
Figure 4:
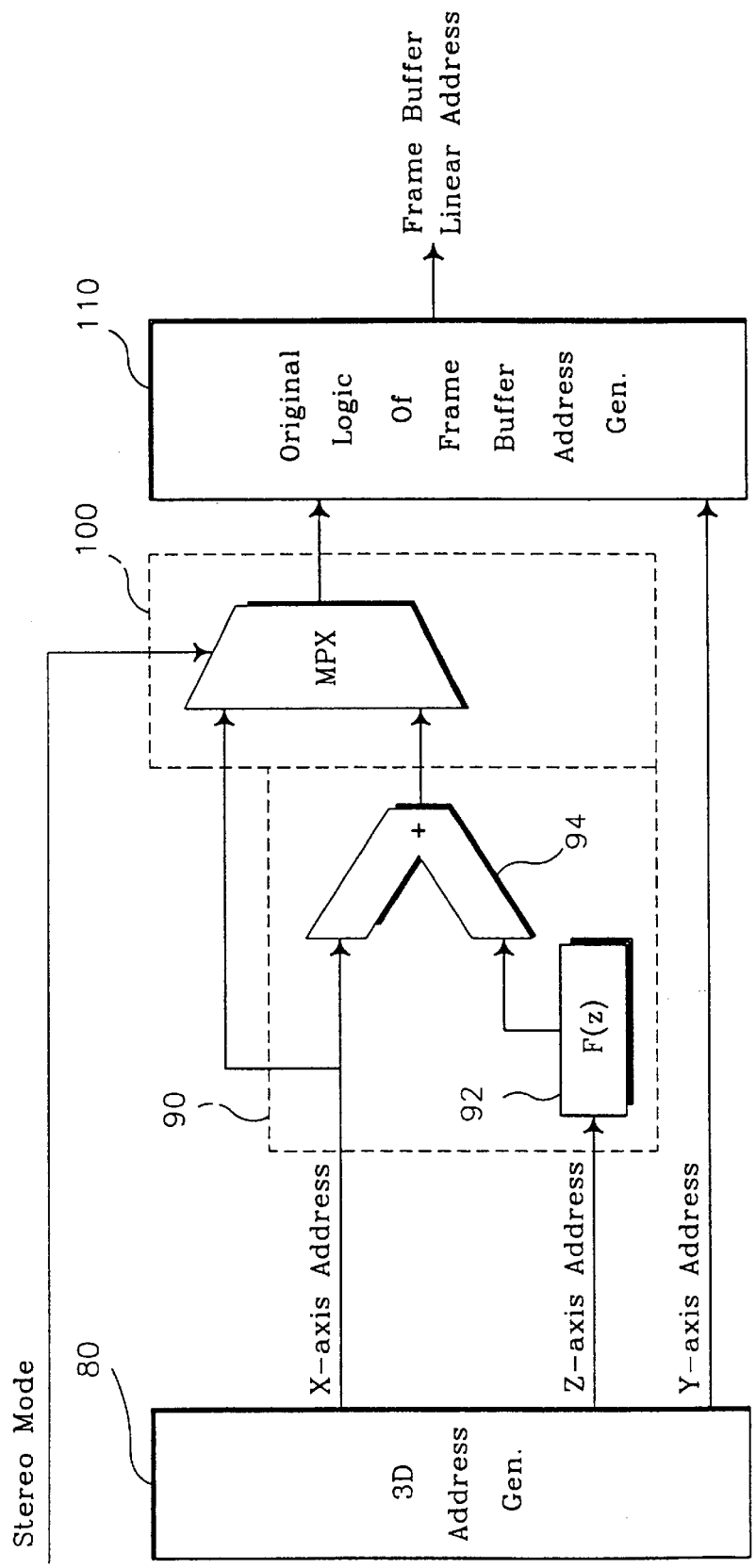
FIG. 4 is a block diagram depiction of a three dimensional parallax drawing system in accordance with the present invention.

Referring to FIG. 4, there is shown a three dimensional graphic accelerator for use with a graphic board in accordance with the invention. The graphic accelerator includes a three dimensional address generator 80 and a frame buffer address generator 110. An address correction circuit 90 is coupled to X-axis and Z-axis address outputs of the three dimensional address generator 80. The address correction circuit 90 comprises an operation unit 92 and an adder 94. The output of the adder 94 and X-axis address output line are connected to inputs of an address selection part 100. The address selection part 100 includes a multiplexer. The control input of the multiplexer 100 is connected to a 'stereo mode' signal line. The multiplexer output and Y-axis address output of the three dimensional address generator 80 are connected to inputs of the frame buffer address generator 110. A frame buffer, not shown, is coupled to the output of the address generator 110 to supply frame buffer linear addresses for the raster display monitor.

In this arrangement, the three dimensional address generator 80 generates the original X-axis, Y-axis and Z-axis addresses of an image. The address correction circuit 90 receives the original X-axis address and Z-axis address outputs and produces the corrected X-axis address. The address selection part 100 outputs either the original X-axis address supplied from the three dimensional address generator 80 or the corrected X-axis address from the address correction circuit 90 in response to a control signal which requests the stereo graphic mode. The frame buffer address generator 110 converts the resultant X-axis address received from the address selection part 100 and the Y-axis address received from the three dimensional address generator 80 into the frame buffer linear address.

Correction of X-axis addresses is to provide parallax on scan lines of the monitor in the X-axis direction. The operation unit 92 of the address correction circuit 90 calculates the correction amount based on the Z-axis address supplied from the three dimensional address generator 80.

Figure 5:
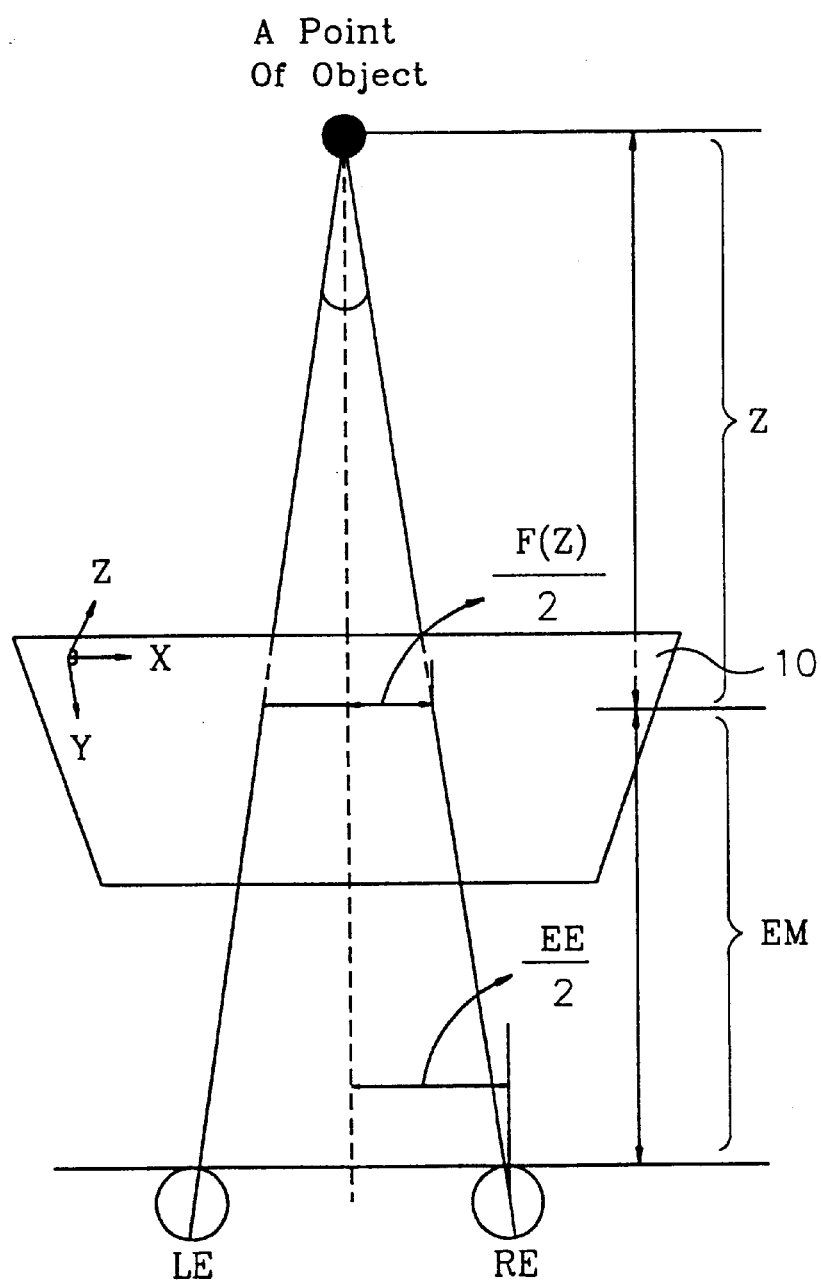
FIG. 5 is a graphical representation for explaining a calculation method of a function F(z) for correcting the X-axis address of a monitor screen.

As shown in FIG. 5, if the monitor screen is replaced by the view plane 10, and an object to be seen by two eyes LE, RE is located at a point a distance Z behind the view plane 10, the correction amount relative to that point can be obtained by the rules of proportion in triangles as follows:

$$\frac{F(z)}{2} : \frac{EE}{2} = Z : Z + EM$$

$$\frac{EE \cdot Z}{2} = \frac{F(z)(Z + EM)}{2}$$

$$F(z) = \frac{EE \cdot Z}{Z + EM}$$

Where EE is the distance between two eyes, EM is the distance between the view plane 10 and the eyes, and F(z) represents the distance in the X-axis direction of view plane 10 between a line drawn from the left eye LE and the point and a line drawn from the right eye RE and the point.

In this equation, Z corresponds to the Z-axis address, and thus F(z) becomes the correction amount. This correction amount F(z) is added to the original X-axis address. The resultant X-axis address and the Y-axis address are supplied to the frame buffer address generator 110 upon receiving the stereo mode selection signal at the address selection part 100.

With this, the X-axis parallax of human eyes relative to all points of an object can be converted into the X-axis addresses. Thus, once the 3-D image of the object is projected with separation of the left and right eyes, views and reflecting the corrected X-axis addresses, a more vivid image having a better perspective can be seen though the LCD shutters.

Figure 6:
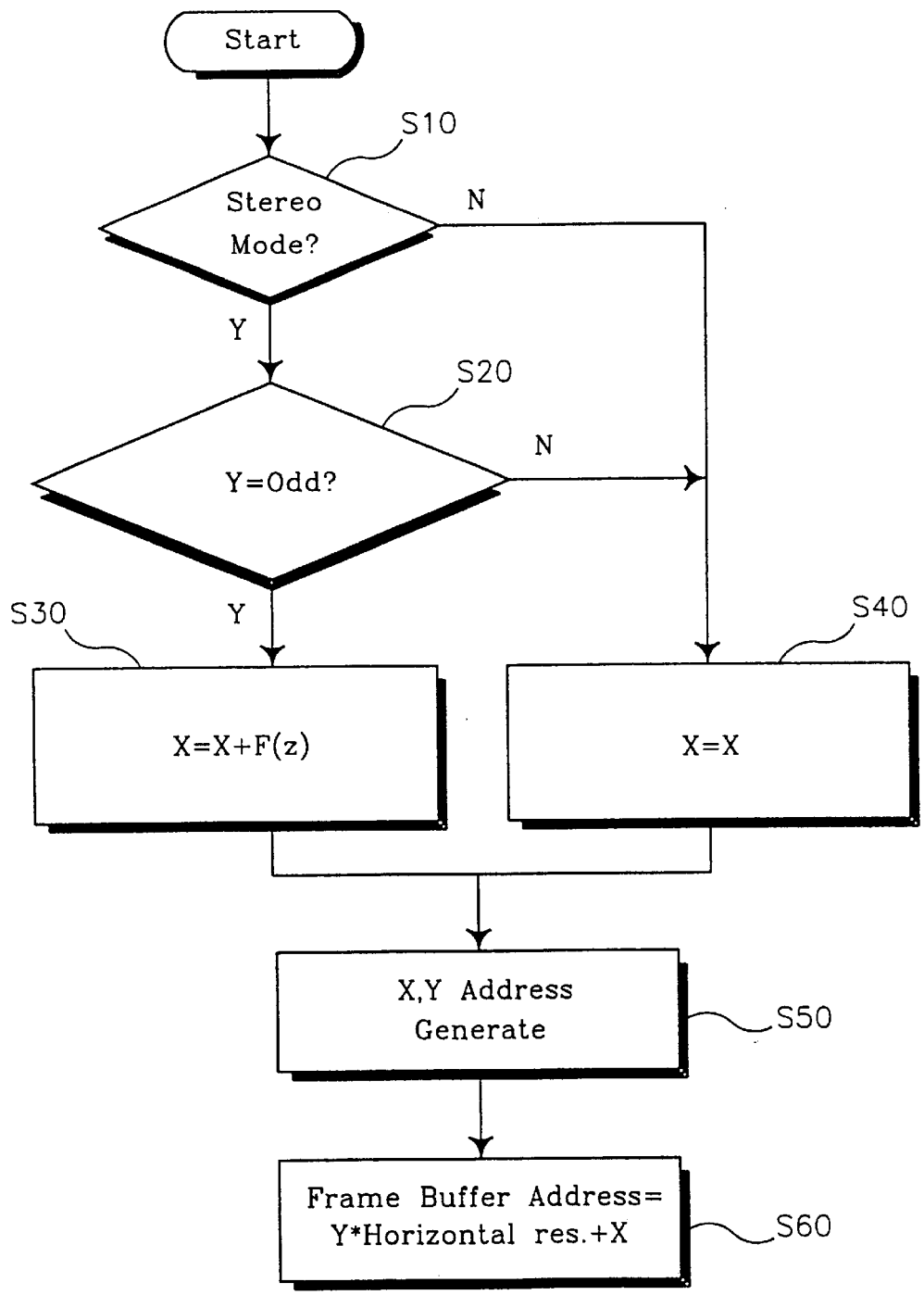
FIG. 6 is a flow diagram showing a 3-D parallax drawing method in accordance with the present invention.

The detailed 3-D parallax drawing method is shown in FIG. 6. There, when started, a determination is made as to whether the stereo mode control signal is received at step 10. If the control signal is received, a further determination is made as to whether the Y-axis vertical line is the one that is necessary to give a parallax on X-axis scan lines. The Y-axis vertical line can be odd vertical line or even vertical line. If it is determined that the Y-axis vertical line is odd, that is, the vertical line is necessary to give a parallax on X-axis scan lines, horizontal points of the X-axis can be determined by the following two expressions:

Horizontal point of even vertical line=mod (frame buffer address/horizontal resolution)

Horizontal point of odd vertical line=mod (frame buffer address/horizontal resolution)+F(z)

where the frame buffer address denotes the linear address that is converted from the two dimensional X-axis address and the Y-axis address, and is calculated from the following:

Frame buffer address=(Y-axis pixel numbers*horizontal resolution)+last scan line pixel numbers where the horizontal resolution means the number of pixels in a scan line. Also, mod denotes an operator.

Thus, at the next step 30, the multiplexer 100 selects the output of the X-axis address in which the correction amount F(z) is added to the original X-axis address.

If it is found that the system does not require the stereo mode at step 10 or the Y-axis vertical line is not one that is necessary to give a parallax on X-axis scan lines at step 20, the multiplexer 100 outputs the original X-axis address as the X-axis address at step 40.

Then, in the frame buffer address generator 110, two dimensional X-axis and Y-axis addresses are generated at step 50 based on the resultant X-axis address received from the multiplexer 100 and the Y-axis address received from the three dimensional address generator 80. There, frame buffer linear address are generated.

As is apparent from the foregoing, the three dimensional parallax drawing system of the invention provides for vivid stereo graphics by correcting the X-axis address of the address generator and giving the parallax on the required X-axis scan lines in the address selection part of the 3-D graphic accelerator. Also, it is useful when the parallax drawing method is adopted for use with three dimensional virtual reality.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. A method for a three dimensional parallax drawing system having a 3-D address generator which generates an original X-axis address, a Y-axis address, and a Z-axis address of an image, the method comprising:

generating a corrected X-axis address in response to the original X-axis address and the Z-axis address;

selecting either the original X-axis address or the corrected X-axis address as a resultant X-axis address in response to a stereo graphic mode request signal;

converting the resultant X-axis address and the Y-axis address into a frame buffer address;

determining whether a Y-axis vertical line is one that is necessary to give a parallax on X-axis scan lines;

if the Y-axis vertical line is one that is necessary to give a parallax on X-axis scan lines, determining a horizontal point for the vertical line by the following expression:

mod (frame buffer address/horizontal resolution)+F(z)

where F(z) is a correction amount, and the frame buffer address denotes a linear address that is converted from the resultant X-axis address and the Y-axis address according to the following equation:

frame buffer address=(Y-axis pixel numbers*horizontal resolution)+last scan line pixel numbers where the horizontal resolution is the number of pixels in a scan line; and if the Y-axis vertical line is not one that is necessary to give a parallax on X-axis scan lines, determining a horizontal point for the vertical line by the following expression:

mod (frame buffer address/horizontal resolution).

2. A three dimensional parallax drawing method comprising:

generating an X-axis address, a Y-axis address, and a Z-axis address;

calculating a correction amount responsive to the Z-axis address;

adding the correction amount to the X-axis address, thereby generating a corrected X-axis address; and selecting either the X-axis address or the corrected X-axis address in response to a stereo graphic mode request signal;

wherein selecting either the X-axis address or the corrected X-axis address includes:

selecting the X-axis address if the Y-axis address corresponds to a vertical line that is not necessary to achieve parallax on a X-axis scan line; and selecting the corrected X-axis address if the Y-axis address corresponds to a vertical line that is necessary to achieve parallax on the X-axis scan line.

3. A three dimensional parallax drawing method comprising:

generating an original X-axis address, a Y-axis address, and a Z-axis address for a plurality of points in a frame of an image having separate views for each eye;

generating a correction amount for each of the plurality of points responsive to the Z-axis address for each point; and generating a corrected X-axis address for each of the plurality of points responsive to the original X-axis address and the correction amount for each of the plurality of points, wherein each of the plurality of points in the frame can have a different correction amount;

selecting the original X-axis address if the Y-axis address corresponds to a vertical line that is not necessary to achieve parallax on a X-axis scan line, and selecting the corrected X-axis address if the Y-axis address corresponds to a vertical line that is necessary to achieve parallax on the X-axis scan line.

4. The method of claim 3 wherein generating a corrected X-axis address for each of the plurality of points comprises adding the correction amount for each point to the original X-axis address for each point.

5. The method of claim 3, wherein selecting the original X-axis address and selecting the corrected X-axis address occurs in response to a stereo graphic mode request signal.

* * * * *